United States Patent [19]

Lormois et al.

[11] Patent Number: 5,394,200
[45] Date of Patent: Feb. 28, 1995

[54] AUTOMATIC KERATOMETRIC MEASURING METHOD AND DEVICE FOR IMPLEMENTING SAID METHOD

[75] Inventors: Jean-Pierre Lormois, Barjouville; Patrick Lafond, Nozay, both of France

[73] Assignee: Luneau, S.A., France

[21] Appl. No.: 6,280

[22] Filed: Jan. 19, 1993

Related U.S. Application Data

[63] Continuation-in-part of Ser. No. 606,995, Oct. 31, 1990, abandoned.

[30] Foreign Application Priority Data

Oct. 31, 1989 [FR] France .................. 89 14257

[51] Int. Cl.⁶ .................................................. A61B 3/10
[52] U.S. Cl. ...................................... 351/212; 351/211; 351/247
[58] Field of Search ............... 351/212, 211, 214, 221, 351/247

[56] References Cited

U.S. PATENT DOCUMENTS

| | | | |
|---|---|---|---|
| 4,660,946 | 4/1987 | Nakamura et al. | 351/247 |
| 4,917,458 | 4/1990 | Matsumura | 351/212 |
| 4,929,076 | 5/1990 | Masuda et al. | 351/212 |

Primary Examiner—William L. Sikes
Assistant Examiner—Hung Xuan Dang
Attorney, Agent, or Firm—William A. Drucker

[57] ABSTRACT

The device comprises a luminous source 3 in the form of a circular ring, an optical doublet 4 and a matrix camera 5 on the lens of which the doublet 4 carries the elliptic image of the source 3 given by the cornea 2 of the eye 1. An electronic card 15 connected to the outlet of the matrix camera 5 supplies from a video signal, made up of a plurality of video lines and derived from the camera 5, a plurality of numerical values describing the elliptic image. A microprocessor element 19 receives and processes this plurality of numerical values so as to extract the value information from the large bending radius, the small bending radius and the angular position of the main axis of the cornea 2.

6 Claims, 3 Drawing Sheets

AUTOMATIC KERATOMETRIC MEASURING METHOD AND DEVICE FOR IMPLEMENTING SAID METHOD

This is a continuation-in-part application of our application No. 07/606,995, filed on Oct. 31, 1990, now abandoned.

FIELD OF THE INVENTION

The purpose of the present patent application is to provide a keratometric measuring method, that is a method for measuring the external face of the eye cornea, and an automatic device, known as a an autokeratometer, ensuring the implementation of said method.

As already known, the eye cornea seems to be spherical, but in fact it is able to be assimilated in most cases with a toric surface with a principal axis where the largest bending radius is situated and a secondary axis perpendicular to it where the smallest bending radius is situated. Thus, the purpose of said measurement is to determine the value of the largest and smallest bending radii, as well as the angular position of the principal axis of the cornea. A knowledge of this elements is in fact important in ophtalmology so as to correct convergence due to the cornea being preponderant in the convergence of the eye.

There exists a known automatic keratometric measuring method according to which, in order to determine the values of the large and small bending radii of the cornea as well as the angular position of the principal axis, the following operations are carried out:

placing a circular crown-shaped luminous source in front of the cornea of the eye to be examined, breaking-up of the elliptical image of the luminous source given by the cornea into five different images offset and orientated with respect to one another, inserting on each of the five image fragments thus obtained a linear photodiode element so that, depending on the size of the ellipse, the intersection of each image fragment along with the linear element is more or less situated near the beginning of this element so as to accordingly supply five items of information, data processing of these five items of information by means of a suitable software so as to obtain the curve of the ellipse and extraction of the values of the two bending radii and the angular position of the principal axis.

This method breaking up into five portions an image given by the cornea has the drawback of requiring the use of a complex optical device including in part a prism in the shape of a five sided pyramid, this method proving to be costly and requiring a delicate adjustment. This method also requires a large number of electronic elements which adversely affect the cost price and result in causing adjustment difficulties. Moreover, the number of useful items of information collected and processed is not important, which may affect the accuracy of the measurement taken.

SUMMARY OF THE INVENTION

The purpose of the present invention is to overcome the drawbacks of known automatic keratometric measuring methods and to this effect proposes an automatic keratometric measuring method, as well as a device for implementing said method at a reasonable cost and which provide fully accurate measurements easy to adjust.

According to the invention, the automatic keratometric measuring method comprises the following successive phases:

of the cornea, a matrix camera and an optical system inserted between the eye to be examined and the matrix camera so as to carry on the latter the optical image of the luminous source given by the cornea, the matrix camera allowing a measure to be performed based on a large number of points (about a hundred). An electronic device cooperates with the output of the matrix camera so as to carry out the counting operations on the electronic-video signal supplied by said camera. The measure performed on about a hundred points is particularly advantageous, with relation to known devices performing measures on only a few points, in the case of corneas of which the theoretically toric shape is in fact often irregular.

According to the invention, the automatic keratometric measuring device or autokeratometer may be used alone, but it may also be advantageously associated with a conventional automatic refractometer so that, by using a certain number of elements having the same structure as said refractometer, a single device providing the two (autorefractometer and autokeratometer) functions is obtained without the cost being higher than that involved for a device solely providing the autorefractometer function.

BRIEF DESCRIPTION OF THE DRAWINGS

So as to fully understand the invention, there now follows non-restrictive examples of preferred embodiments with reference made to the accompanying diagrammatic drawing in which.

DETAILED DESCRIPTION OF THE PREFERRED EMBODIMENTS

Figure 1:
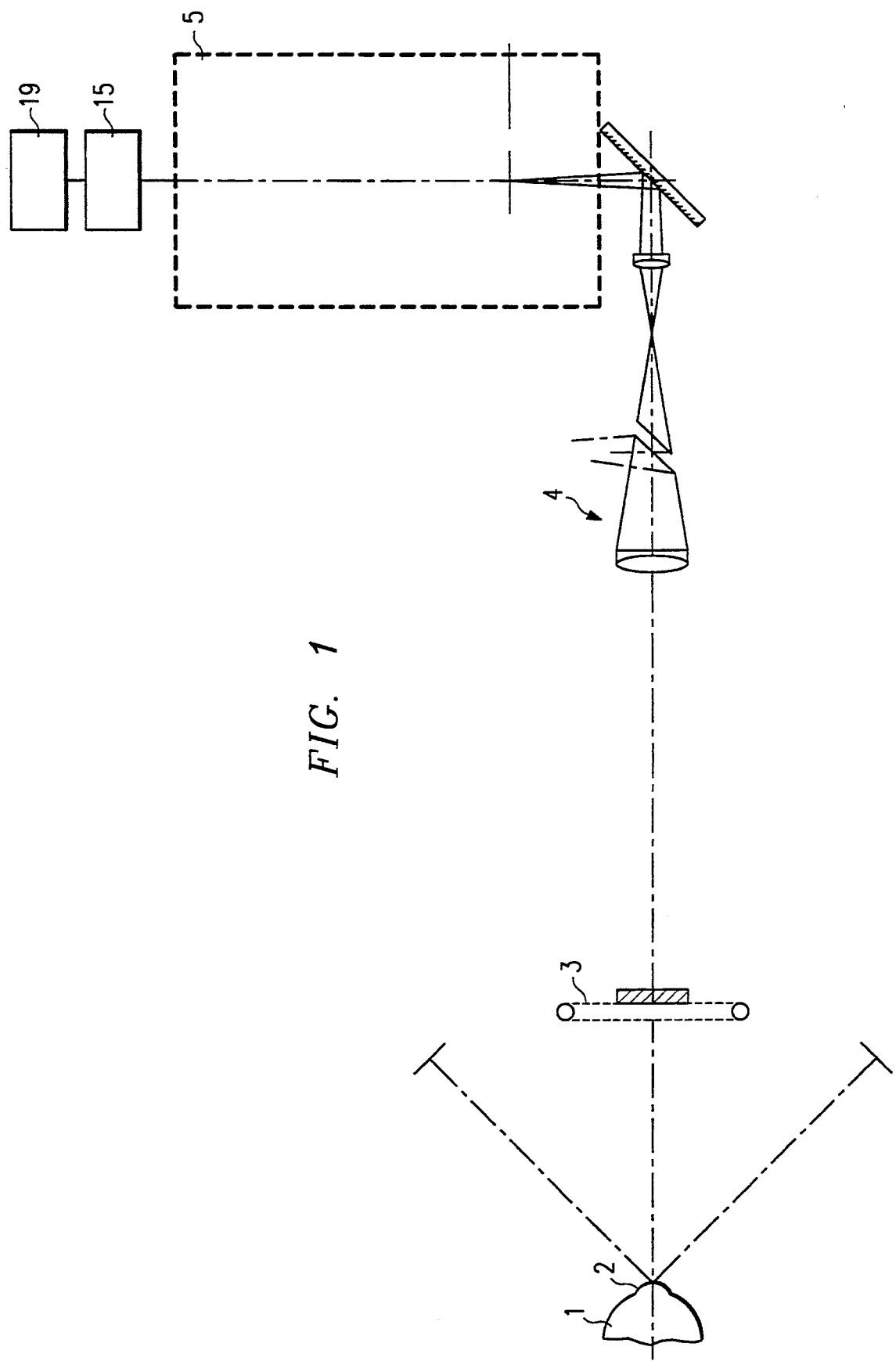
FIG. 1 is a skeleton diagram of an automatic keratometric device intended to implement the method of the invention.
Figure 2:
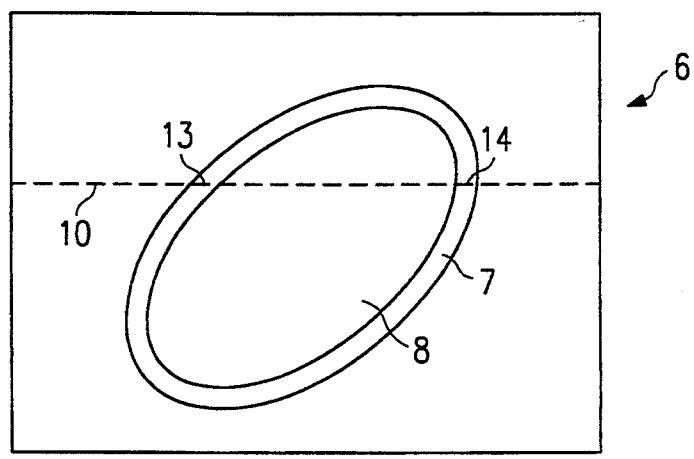
FIG. 2 is a view of the elliptical image picked up by the matrix camera of the device of FIG. 1.

FIG. 1 shows a diagram at 1 of the eye to be examined and at 2 the cornea whose characteristic quantities measurement is to be obtained, that is the length of the large bending radius, that of the small bending radius and the angular position of the principal axis. Shown at 8 is a flash tube forming a circular crown-shaped luminous source whose cornea 2, acting as a mirror, produces an elliptical image. An optical doublet 4 enables the image to be transferred on a matrix CCD camera 5, called a "solid imager". FIG. 2 shows the optical image 6 supplied to the camera 5 and which is formed by the elliptical image of a luminous circle 7 on a dark background 8.

The camera 9 thus supplies a CCIR standard electronic-video signal, which fully describes the image 6 and which is formed by each of two frames of 288 video lines, each video line representing one horizontal line of the image 6, the amplitude of the electronic signal on the video line being that much greater when the image is white. FIG. 8 shows a video signal line 9 corresponding to the horizontal line 10 of the optical image 6. It can be seen that the amplitude of the signal exhibits two peaks 11, 12 respectively corresponding to the portions 13 and 14 of the elliptical image 7 on the line 10.

Figure 3:
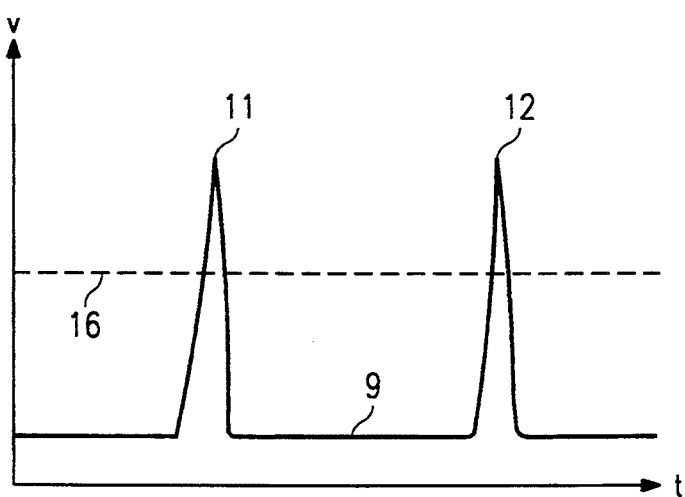
FIG. 3 is a diagram showing a signal electronic-video line supplied by the matrix camera and corresponding to one horizontal line of the image of FIG. 2.
Figure 4:
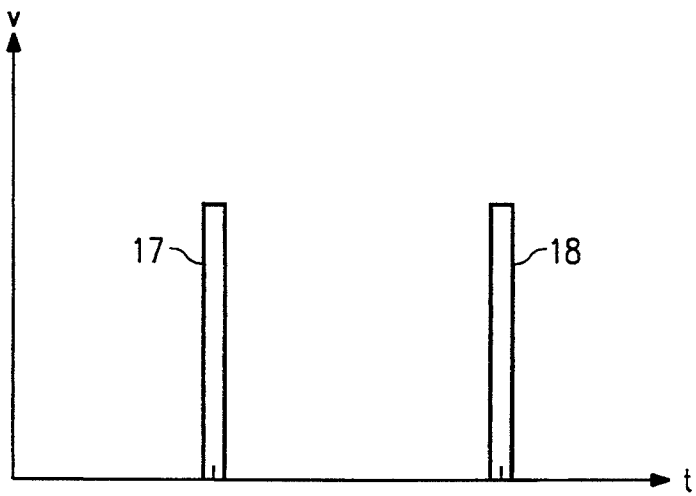
FIG. 4 is a diagram corresponding to FIG. 3 showing the signal electronic-video line following binarization of the signal by comparison with a threshold level.
Figure 5:
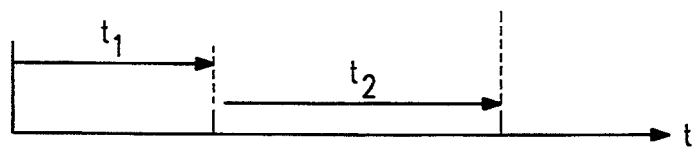
FIG. 5 is a diagram corresponding to FIG. 4 showing the signal electronic-video line following processing period counting.

With the aid of an electronic card 15 connected to the output of the camera 5, for each video signal line 9, the following operations are carried out in real time and consisting of:

a binarizing of the signal by comparing the latter with a threshold level (as shown at 16 on FIG. 3) so as to obtain a signal with two peaks 17, 18 without any grey levels (see FIG. 4).

counting the time t1 running between the start of the video signal line and the first peak 17, and counting the time t2 running between the first peak 17 and the second peak 18 (see FIG. 5).

These two values obtained for each of the 576 lines of the video signal frame are entered into a microprocessor card 19 and thus form a maximum of 1152 values numerically describing the elliptical image. Then, these values are merely processed by the algorithm of a suitable software so as to obtain the sought-after values of the large and small bending radii and the angular position of the principal axis of the cornea 2 of the eye 1 to be examined.

Therefore, according to the invention, the automatic keratometer may advantageously be associated with a conventional automatic refractometer so as to thus provide a sole device providing the two functions and whose excess cost with respect to using solely the automatic refractometer is relatively low. In fact, in this case, this avoids duplication of a certain number of elements, able to be used for both functions, of the general structure of the device.

Figure 6:
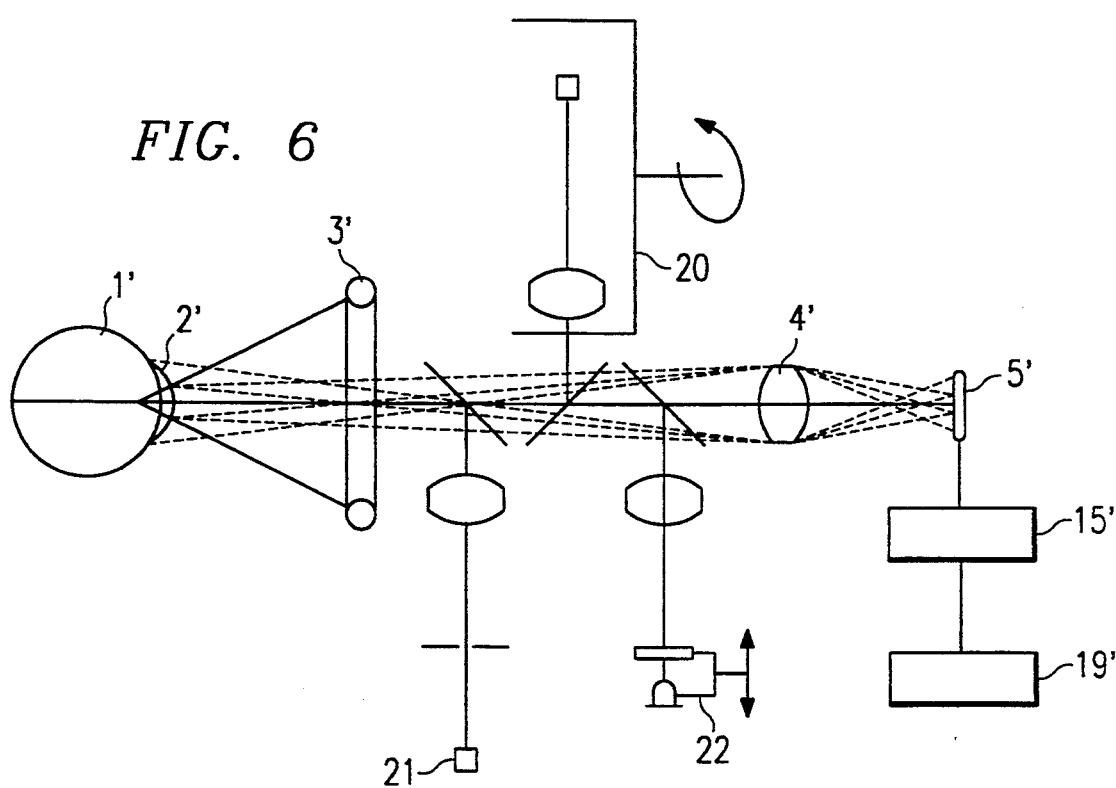
FIG. 6 is a skeleton diagram of an automatic keratometric device also acting as an automatic refractometer, the device being shown when operating as an autokeratometer.
Figure 7:
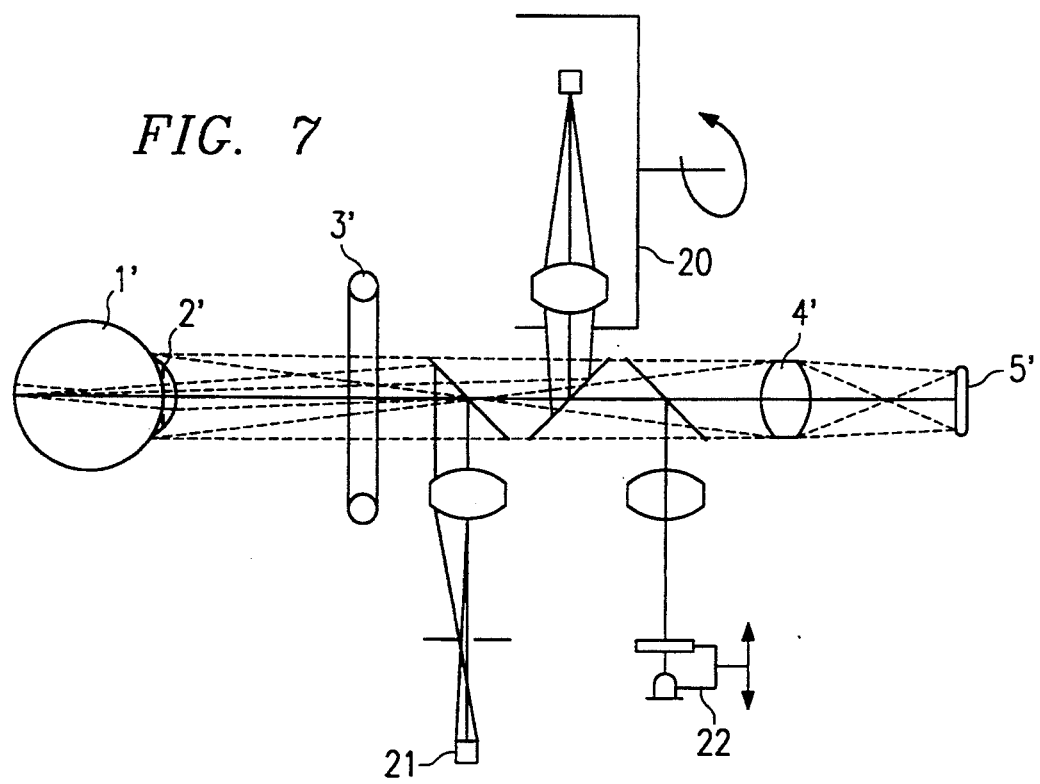
FIG. 7 shows the skeleton diagram of the device of FIG. 6 when operating as an autorefractometer.

To this end has been shown at FIGS. 6 and 7 an automatic keratometer according to the invention which, with the only adjunction of a pick-up performing a measure of the refractive index, can also selectively operate as an autorefractometer.

In the device of FIGS. 6 and 7 is shown at 1' a diagram of the eye to be examined, at 2' the eye cornea, at 3' a flash tube acting as luminar source, at 4' an optical doublet and at 5' a matrix CCD camera to which is transferred the image of the luminar source given by the cornea 2'. At 15' is shown an electronic card connected to the output of the camera 5' and at 19' is shown a microprocessor card. At 20 is shown a luminar source provided with a slot, at 21 a pick-up adapted to perform the measure of the refraction index and at 22 a target to be fixed by the patient's eye.

With the disposition shown at FIG. 6 the device operates to perform a keratometry measure according to the method explained with reference to FIGS. 1 to 5, the luminar source 20 and the pick-up 21 not being used and thus being switched off.

To operate as an autorefractometer according to the disposition of FIG. 7, the luminar source 3' is switched off while the electronic card 15' and the microprocessor card 19' are removed (they are thus not shown at FIG. 7), and the luminar source 20 as well as the pick-up 21 are switched on. As can be seen from the optical diagram of FIG. 7, a measure of the refraction index is performed with the same device as for the measure of keratometry, using the same optical elements and CCD captor that is an important characteristic of this device.

That allows to provide an apparatus, being both an autokeratometer and an autorefractometer, which is of a reduced volume and of a cost substantially lowered with relation to know apparatus performing both functions.

What is claimed is:

1. Automatic keratometric measuring method consisting of placing a circular crown-shaped luminous source in front of the cornea of the eye to be examined, and of processing numerical information relating to the elliptical image of the crown given by the cornea extracting the values of the large and small bending radii and the angular position of the principal axis of the cornea, wherein the elliptical image given by the cornea transforming into an electronic-video signal constituted by a series of electronic-video lines each corresponding to one horizontal line of the elliptical image and whose amplitude depends on the contrast of the image with respect to its background, and wherein a measurement is made on each electronic-video line of the signal of time indications characterizing portions of the image belonging to the corresponding horizontal line of the image, and wherein all the time indications corresponding to a series of electronic-video lines of the signal are processed on a computer with the aid of a suitable software.

2. Method according to claim 1, wherein each video signal line exhibits two peaks corresponding to the portions of the image present on the corresponding horizontal line of the image said measured time indications being those separating the beginning of the video line and the first peak and separating the first peak and the second peak.

3. Method according to claim 2, wherein, prior to said measurement of time indications, the signal is binarized so as to suppress grey levels.

4. An automatic keratometric measuring device including a circular crown-shaped luminous source, a matrix camera allowing a measure to be performed, about a hundred points, a lens forming the image of the luminous source given by the cornea of the eye to be examined, an electronic card connected to the output of the matrix camera and supplying, from the video signal formed by a plurality of video lines and supplied by the matrix camera, a plurality of numerical values describing the elliptical image, and a microprocessor element receiving and processing said plurality of the numerical values so as to extract information concerning the value of the large and small bending radii and the angular position of the principal axis of the cornea.

5. An automatics Karatometric measuring device according to claim 4, wherein said electronic card connected to the output of the matrix camera comprises means fop binarizing the video signal supplied by the matrix camera by comparing the latter with a constant value so as to obtain a signal with two peaks, and means for counting the time running between the start of a video signal line and each one of the two peaks thus providing two numerical values for each video line of the image.

6. An automatic Karatometric measuring device according to claim 4 wherein are further provided means for measuring refraction index, said means for measuring refraction index being switched off to allow the equipment to operate as an autokeratometer, while said electronic card and said microprocessor element are switched off to allow the same equipment to operate as an autorefractometer.

* * * * *